United States Patent [19]

Giebler et al.

[11] 3,820,077

[45] June 25, 1974

[54] METHOD FOR TESTING UNITS OF A PROGRAM CONTROLLED DATA PROCESSING SYSTEM

[76] Inventors: Fritz Giebler, Sauerbruchstrasse 10/9, 8 Munchen 55; Hans-Ulrich Möder, Littmannstrasse 3, 8 Munchen 71; Jürgen Rabold, Forstenrieder Allee 167, 8 Munchen 71; Bernhard Schaffer, Kemptener Strasse 63, 8 Munchen 49, all of Germany

[22] Filed: Feb. 9, 1972

[21] Appl. No.: 224,895

[30] Foreign Application Priority Data

Feb. 10, 1971 Germany .......................... 2106163

[52] U.S. Cl. ........................ 340/172.5, 235/153 AC

[51] Int. Cl. .......................................... G06f 11/02

[58] Field of Search ........... 340/172.5; 235/153 AC; 444/1; 324/73 R, 73 AT

[56] References Cited

UNITED STATES PATENTS

| | | | |
|---|---|---|---|
| 3,167,685 | 1/1965 | Bade et al. | 340/172.5 X |
| 3,478,286 | 11/1969 | Dervan | 235/153 AC |
| 3,535,683 | 10/1970 | Woods et al. | 340/172.5 |
| 3,551,891 | 12/1970 | Hermes et al. | 340/172.5 |
| 3,551,893 | 12/1970 | Mehnert et al. | 340/172.5 |
| 3,573,751 | 4/1971 | DeLisle | 340/172.5 |
| 3,624,617 | 11/1971 | Putterman et al. | 340/172.5 |

*Primary Examiner*—Paul J. Henon
*Assistant Examiner*—Melvin B. Chapnick
*Attorney, Agent, or Firm*—Schuyler, Birch, Swindler, McKie and Beckett

[57] ABSTRACT

A method for testing system units or modules in a modularly constructed data processing system wherein the testing is performed by changing the supply voltage to the system unit under test. After requesting and receiving assignment of a storage cycle in the system's central memory, a program control generates and transmits a command signal. The command signal is evaluated, and a signal datum responsive thereto is formed and transmitted to a power supply connected to the system unit being tested. Depending on the information contained in the latter transmitted signal, the operating voltage of the system unit can be adjusted to approach the limits prescribed for the particular system unit. The operability of the system unit is determined from its response to operating voltages near the outer limits of its range.

5 Claims, 3 Drawing Figures

METHOD FOR TESTING UNITS OF A PROGRAM CONTROLLED DATA PROCESSING SYSTEM

BACKGROUND OF THE INVENTION

The invention relates to a method for testing individual units of a modularly built program controlled data processing system by adjusting the operating voltage.

Very great demands are made on the reliability of program controlled data processing systems, especially when dealing with processing systems which must be constantly ready for operation. A good example of the latter is a program controlled telecommunication exchange switching system. In such systems loss of individual system units is not allowed in any way to lead to loss of the entire system. To increase the reliability it is known to increase the redundancy of a system, for example by doubling the whole system or by doubling the individual units of the system. Further, it is known to provide for the interchangeability of individual component areas of the system, in order to increase the safety and reliability. In the data processing technology this type of system construction is denoted by the concept "modular construction," whereby a number of interchangeable system components or modules of different types, called system units in the following, are formed into a complete data processing system.

However, the reliability of a data processing system cannot solely depend on the fact that with loss of one system unit the whole system continues to operate without interruption, but rather it is just as important to be able to prevent difficulties by testing and monitoring the functioning of the system, even while it operates error-free. For this purpose it is known to compare the results of the processes running in the various system units, or to have test programs, so-called routine tests, run periodically. Within the framework of such routine tests, it is known to determine the operational reliability by changing the operating voltage during the running of a test program in order to determine deviations in the operation through decrease or increase of the operating voltages in the marginal areas of the prescribed operating voltage ratings. It has been established that the change in operating voltage is a very good aid in early recognition or location of errors. This test is often called a "marginal check."

It is an object of this invention to provide a method utilizing the aforementioned voltage changing technique for testing the individual elements of a data processing system, which method will provide results of greater reliability and accuracy.

SUMMARY OF THE INVENTION

In accordance with the invention, the foregoing and other objects are achieved in that a command datum proceeding from a program control unit is coupled in a known manner to a signal station over the system's standard interface, which connects the various system units, after the requesting and allocation of a storage cycle. After evaluation of the command information, a signal datum is formed and forwarded to a current supply device connected to a system unit to be tested. In the system unit, independent of the transmitted signal datum, the operating voltage of the system unit can be varied in the marginal areas of the values prescribed for its operation. Simultaneously, with the execution of a change in voltage, a notification datum reaches the transmitter, which is available to the central part of the system and, after entry into a specific part of the central store, serves as information for a test program. The current supply device is reset in a program controlled manner over the signal station or over an auxiliary resetting means.

The signal station, which is reached through a change-command emanating from a program control unit of the system, can be placed in the system either centrally or peripherally. In the first case, the signal station can be reached over the system's standard interface. This can occur in a known way in that a program control unit emitting a change-command requests a storage cycle from the central memory of the system to transfer the program to the signal station, by setting a requirement bit in the central processor of the system. After the command information is decoded in the signal station, a specific current supply device can be reached therefrom, to which a corresponding signal datum is then given, and this signal datum causes the change of operating voltage in the applicable current supply device.

In the second case, i.e., for peripheral placement of the signal station, such a signal station is connected to each system unit whose current supply devices should be included in the programmed voltage change. The commands issuing from a program control unit are thereby given in a known manner to a specific system unit, whose current supply devices are supposed to be adjusted. Also, in this case, the change command is initiated accordingly through programs which run in the program control units. The non-centrally located signal stations can be present either as a part of the system unit to be tested or as units separate therefrom. Besides these two indicated possibilities for the arrangement of the signal station, they can be arranged partially central, for example, for a certain group of system units, and partially non-central.

The execution of a command effecting changes of the operating voltage is acknowledged by the individual current supply devices through a notification datum, which is available to the central processor for the purpose of monitoring. This can occur, for example, in that the notification data are directed collectively to a central inquiry device, and from there can be reached within the framework of a program. They can thus be entered into a specific storage area of the central store and are then available to a test program, which for example, can monitor the execution of change-programs as well as their correctness, through comparison of the data triggering the change with the data arriving after execution of the change.

Resetting the individual current supply devices back to the operational state, during which they emit the prescribed operating voltage, can proceed through an appropriate command or through forcible resetting of the applicable current supply device. In particular, for the last indicated possibility a reset line is present which can be controlled by the inquiry device, which for example is located in the cable over which the notification datum is transmitted; this is of special advantage. Thereby, the possibility exists to hold the current supply devices to their rated operating values even during error-free operation of the signal stations.

It has already been proposed in German Patent Application Serial No. P 20 12 052.9, that for the programmed search for errors in a program controlled processing system, a malfunctioning system unit be placed in a special diagnosis state, during which the defective system unit can have traffic only with those properly functioning system units of the remainder of the system which are also in the diagnosis state, either constantly or from time to time. Thereby, the advantage is achieved that defective system units can have traffic with other system units during the running of its diagnostic program only when those other system units are in the diagnosis state. An error which occurs can, therefore, have no effect on the total system.

Proceeding from the latter teaching, in accordance with this invention, it is further suggested that the change of supply voltage in current supply devices, which are attached to the system units connected to the system's standard interface over which the traffic between the individual system units proceeds, only be executed when the corresponding system units are in the said diagnosis state. The change of the supply voltage in a current supply device, on the other hand, which is attached to a system unit connected directly to the system's standard interface over further external interfaces, is, appropriately, executed only when the system unit, over which the first-named system unit is connected to the system's standard interface, is in the operating state.

BRIEF DESCRIPTION OF THE DRAWINGS:

The principles of the invention will be best understood by reference to a detailed description of alternate preferred embodiments constructed according to those principles given hereinbelow in conjunction with the drawings in which.

Figure 1:
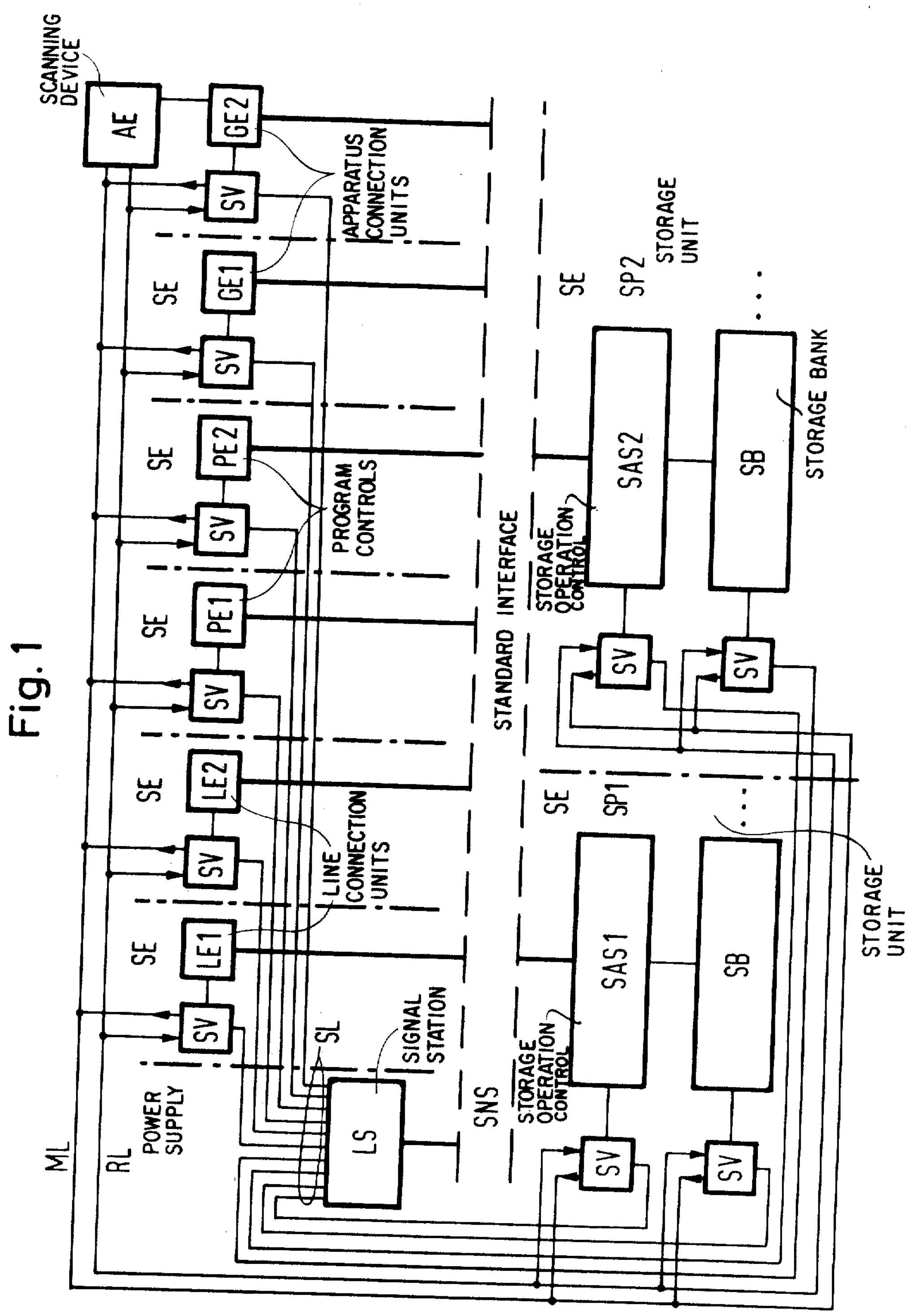
FIG. 1 is a schematic diagram of a data processing system in which the signal station is centrally present and FIG. 2 is a schematic diagram of a data processing system having a non-central arrangement of the signal stations and FIG. 3 is a more detailed illustration of the construction of a current supply circuit and signal station as used in the FIGS. 1 and 2 embodiments.

DETAILED DESCRIPTION OF THE DRAWINGS:

The processing system shown in FIG. 1 is a programmed telecommunication exchange and comprises a series of system units SE, which corresponding to their function in the system, are designated as line connection units, program control units, apparatus connection units, and storage units. Program controlled telecommunication exchanges of the type here in question are well known in the art, as are the components thereof identified above. A detailed description of these is not given, because they have no relation to the invention. The modular construction of the processing system is demonstrated in that the individual system units are present in twos, respectively. For this reason, in FIG. 1, there are, respectively: two line connection units LE1 and LE2; two program control units PE1 and PE2, which serve to control program operations and receive and execute commands; two apparatus connection units GE1 and GE2; as well as two storage units SP1 and SP2. However, application of the invention is not confined to a data processing system which only contains the system units shown in FIG. 1.

In such a system, the traffic between the individual system units always takes place cyclically, over the system's standard interface SNS connecting the individual system units. In addition, every system unit is connected to the system's standard interface over lines for transmission of control signals and for transmission of data.

As is known, a system unit which desires access to another system unit emits a cycle request, which is evaluated in a storage operation control SAS1 or SAS2, connected to the central processor, and this leads to the allotment of a storage cycle. Storage operation controls of the type here in question are known. A detailed description of the construction of the storage operation controls is not essential to an understanding of this invention, and is accordingly not given herein. If more details are required, reference may be had to allowed commonly assigned U.S. application Ser. No. 151,448 and to allowed commonly assigned U.S. application Ser. No. 61,692. In particular, in the aforementioned application Ser. No. 61,692 reference should be had to the description of the memory input/output control SEAS given therein. The information exchange then takes place with the alloted storage cycle.

A power supply device SV is connected to each system unit. The voltage values of the device SV can be changed by programs, in accordance with the invention. In addition, a signal station LS, which is connected to the system's standard interface SNS in the same way as a system unit is provided and thus can be reached from all system units, as well as having access to all system units. Signal station LS is described in greater detail hereinbelow in conjunction with FIG. 3.

Every power supply device can be reached over the signal station LS. The power supply devices themselves are connected with a central inquiry device or scanner of known construction over a notification line ML. Likewise, they can be reached from the central inquiry device or scanner AE over a resetting line RL. The notification line and the reset line can be connected over the wires of a common cable, respectively. The central inquiry device AE can enter traffic with the system, for example, over one of the apparatus connection units, e.g., in FIG. 1 over the apparatus connection unit GE2. As is clear from the description of the operations of the scanning device AE given herein, this element can be a simple multistage binary register with each stage of the register being assigned a power supply device SV.

In the following, the manner of operation of the preferred embodiment shown in FIG. 1 will be described. It is assumed, as a prerequisite, that the transmission of signal data between the signal station LS and the individual power supply devices SV occurs over four signal wires of the signal line SL, for example. In this way, it is possible to undertake a change of the operating voltage in four stages. Thus, through the transmission of a logical 1 on one of the signal wires within a signal line a 5- or 10- percent increase or a 5- or 10- percent decrease of the operating voltage can be caused. It is also possible to set the normal operating voltage through a transmission of a logical 0 appearing on all signal wires of a signal line. However, the invention is not limited to the 4-stage change of the supply voltage. Rather, a multiple change is also possible; that is, several voltages can be set, e.g., also in other stages, whereby a plurality of signal wires can then be present.

The command to change the supply voltage in a power supply device proceeds from one of the program control units, for example from the program control unit PE1. It sets a requirement bit in a part of one of the storage operation controls SAS1. With the alloting of a storage cycle, which is alloted either automatically after setting of the requirement bit or through an inquiry impulse proceeding from the signal station LS and reaching the storage operation control in specific time intervals, the command information is transferred to the signal station LS. There the command information is decoded and transferred as signal information over a signal wire of the signal line SL to a specific power supply device. The changes in the operating voltage are transferred as notification information over the notification line M1 to the central inquiry device AE, and from there, are available to the central processor over the apparatus connection unit GE2 and the system's standard interface SNS. At the same time, within the framework of a program which runs in the program control unit PE1, the changes which are set in the applicable system unit through the voltage change are available to the central processor over the system's standard interface SNS. This means that through a routine test program the manner of operation of the applicable system unit can be checked, on the basis of the available information.

The resetting of the operating voltage to the operating voltage rating can proceed either program-controlled, i.e., proceeding from a program control unit over the signal station LS, or it can also occur over the central inquiry device and the resetting line RL. As already indicated, the latter mode has the advantage that in the case of a defective manner of operation of the signal station, the current supply devices can be kept to their nominal or rated value, or can be reset forcibly to the nominal value.

Figure 2:
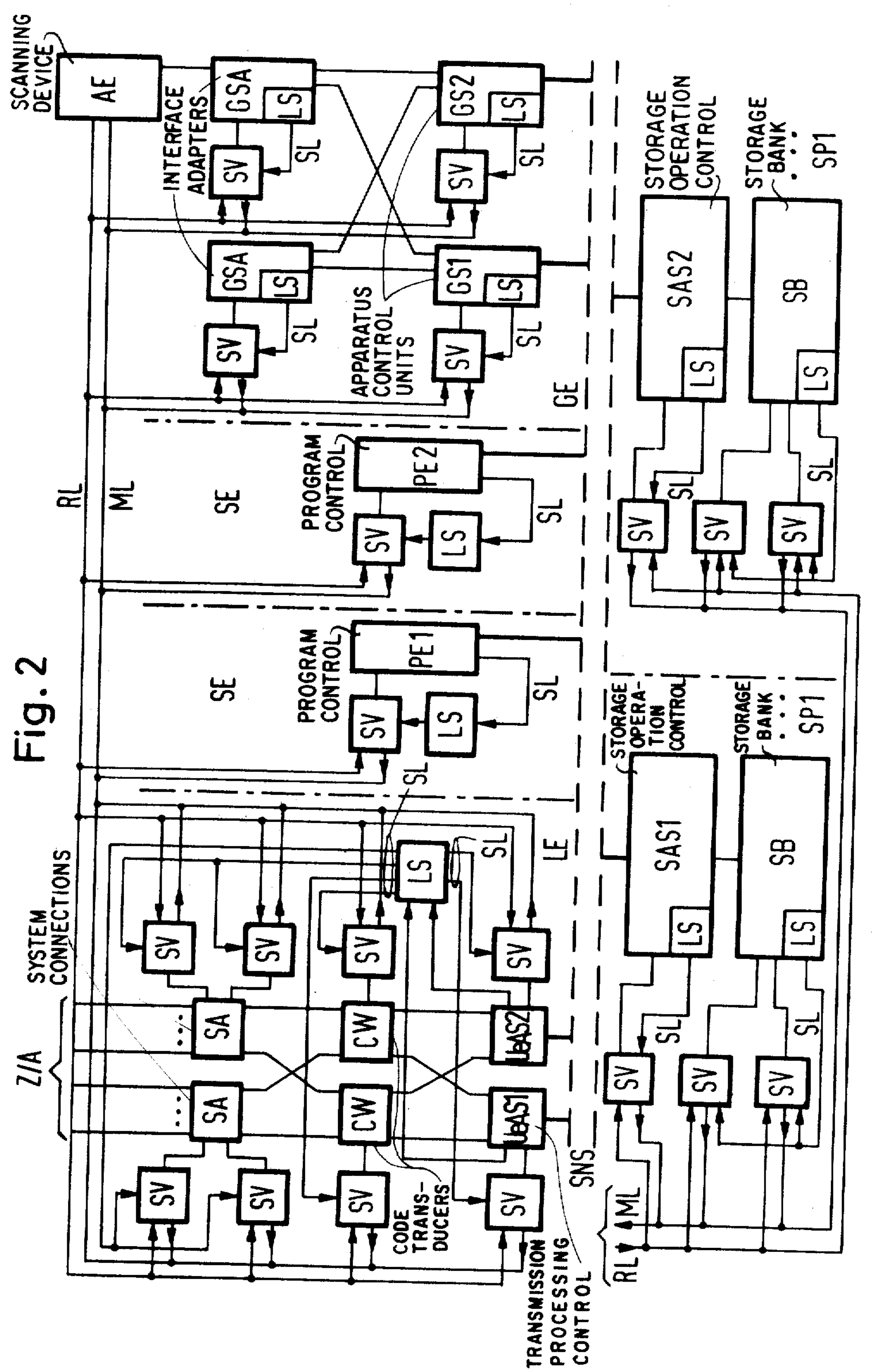

Along with the central arrangement of the signal station shown in the explanatory example of FIG. 1, a non-central arrangement of several signal stations is also possible. The explanatory example of FIG. 2 shows this possibility.

The processing system shown in FIG. 2 contains, once again, the previously mentioned various system units SE, which enter into traffic over interface SNS with the central memory, which is, likewise, redundantly present. Shown as essential system units are, again, the system units present as line connection units LE, in which the transmission process controls UeAS1, UeAS2 connected to the system's standard interface SNS are doubly present, the two program control units PE1, PE2, the apparatus connection unit GE with the doubly present apparatus control units GS1, GS2 and the central storage units SP1, SP2, whose individual storage banks SB are connected to the system's standard interface SNS over the storage operation controls SAS1, SAS2. The line connection unit LE, to which the different external apparatus feed mechanisms, which are denoted in the figure by Z and A, are connected, contains in particular a series of system connections SA, input-output code transducers CW as well as the previously mentioned transmission process controls UeAS2. The apparatus control devices GS1, GS2 have access over the external apparatus interface adapters GSA to the external devices, which are not shown here. The power supply devices attached to each system unit are again denoted by SV. They can, if necessary, be combined into groups of supply devices. The signal stations LS are placed non-centrally or peripherally. Since it is possible to connect a non-central signal station as an independent device or to build it as part of the system unit, in FIG. 2 both possibilities are indicated. The first possibility is shown there for the line connection unit LE and the program control unit PE1 and PE2, whereas the second possibility is shown for the units of the apparatus connection units (GS1, GS2, GSA) and the storage units (SAS1, SAS2, SB). Each current supply device SV is connected with the system unit connected to it over an energy supply line. The current supply devices connected to the individual system units are connected with the signal stations of the system unit over a signal line, respectively. In the explanatory example, in the system unit denoted as line connection unit LE, several current supply devices are attached to the system connections SA, one to the input-output code transducers CW and also one to the transmission process controls UeAS1, UeAS2, respectively. In similar manner, in the system unit denoted as apparatus connection unit, a current supply device is attached to the apparatus control units GS1, GS2, respectively, whereas several current supply devices are attached to the apparatus interface adapters GSA. A current supply is attached to the program control units PE1 and PE2, respectively. Likewise, in the central processor a current supply device is connected to the storage operation control SAS1, SAS2, respectively, and several current supply devices are attached to the individual storage banks SB. The transmission paths drawn in heavy lines in the figure serve for the transmission of control signals and data between the individual system units in the total system.

For the description of the manner of operation of the explanatory example shown in FIG. 2, it should again be assumed that the transmission of command information occurs, for example, over four signal wires of the signal line SL, so that a change of the supply voltage is possible in four stages. The same applies here, that the invention is not confined to the four stage change of the supply voltage. Likewise, the command to change the supply voltage proceeds from a program control, e.g., from the program control PE1, which command through transfer to a system unit is available there to the signal station.

Should the change of operating voltage proceed to a power supply device, which is attached to a program control unit PE1 or PE2, then that is initiated through a special command of one of the program control units itself. It is appropriate to make the execution of this command dependent on the fact that the applicable program control unit is in the previously diagnosis state.

If a change of the operating voltage becomes necessary in one of the current supply devices, which are attached to a storage unit, i.e., if a command is intended for one of the power supply devices attached to the storage operation controls i.e., SAS1, SAS2, or one of the power supply devices attached to the storage banks SB, then this command is also initiated through the requesting of a storage cycle. However, at the same time, a corresponding operation code is connected with the latter command. This command also proceeds from one of the program control units PE1 or PE2. In the process a storage bank or a storage operation control is addressed, and the corresponding command information is transferred to the signal station attached thereto. It emits a signal datum for execution of the command.

The then following operation is appropriately executed, when the applicable storage bank or the applicable storage operation control is in the diagnosis state. In arranging the details of the invention, it is possible in this way to change not only the operating voltage, but also the threshold and regulating voltage, of the core store in a storage bank.

The change of the operating voltage in a power supply device attached to the apparatus connection unit is also initiated through a command datum, which proceeds from a program control unit. It arrives at the current supply device over the applicable system unit and the signal wires of the signal line SL, which power supply device is attached to the apparatus connection unit. If the change command concerns only an apparatus control unit GS1 or GS2, then it is executed only in the diagnosis state of the apparatus control unit. If the change command concerns one of the apparatus interface adapters GSA, then it is executed only in the operational state of the corresponding apparatus control unit GS1, or GS2 and in the operational state of the apparatus interface adapter GSA.

In a similar manner, the power supply devices of the line connection unit LE are influenced by commands which proceed from a program control unit PE1, or PE2. In this case, the voltage change is initiated by a command datum reaching one of the transmission process controls UeAS1 or UeAS2 in the line connection unit LE. If this command concerns a change in the power supply devices attached to a transmission process control, then the corresponding transmission process control can be in the diagnosis state. On the other hand, if a change of voltage is effected in a power supply device attached to the peripheral units of the line connection unit, hence, a power supply device attached to the input-output code transducers CW or the system connection units SA, then the command is executed only in the operational state of the transmission process control. Also, in this case, the power supply device of the peripheral unit of the line connection unit is driven from the signal station LS over the signal wires of the signal lines SL.

Further system units, which are not shown within the framework of the explanatory example, as for example a signal processing unit, can also be tested in the described manner through corresponding commands, which effect a change of the operating voltage.

Reference has already been made to the fact that the execution of a command which leads to a change of the supply voltage is acknowledged by a notification datum. It is especially advantageous to couple these notification data over a special line, e.g., notification line ML, to the inquiry device AE. Since the inquiry device AE can be arranged as a unit, which in the usual manner has access to the system in that it is connected, e.g., over the apparatus connection unit, as shown in the explanatory example, the notification data are then available to a storage area in the storage unit. The storage area is selected by the program of the processing system. The execution of the programmed change commands can thus be monitored there through a test program.

In this connection there results a further advantageous version of the invention, wherein a central resetting line RL is present. A resetting wire can be connected to the line RL in the signal cables and the wire is fed by a suitable output device which can be program-controlled. This can, for example, be the previously mentioned scanner AE. In this way, it is accomplished that all power supply devices can be reset again to the normal operating voltage, even with disturbance of the central signal station or the signal station present in the system unit connected thereto. Then the further advantage results, that a doubling of the signal station is not necessary. In FIG. 2, this is shown in the example of the line connection unit LE, where only a single signal station is present for both transmission controls UeAS1 and UeAS2. In this arrangement, it is not possible to transfer change commands to the units of this system unit when there is a disturbance in the signal station LS. However, the accompanying current supply devices in the peripheral units can be maintained at their theoretical value over the central resetting line.

Figure 3:
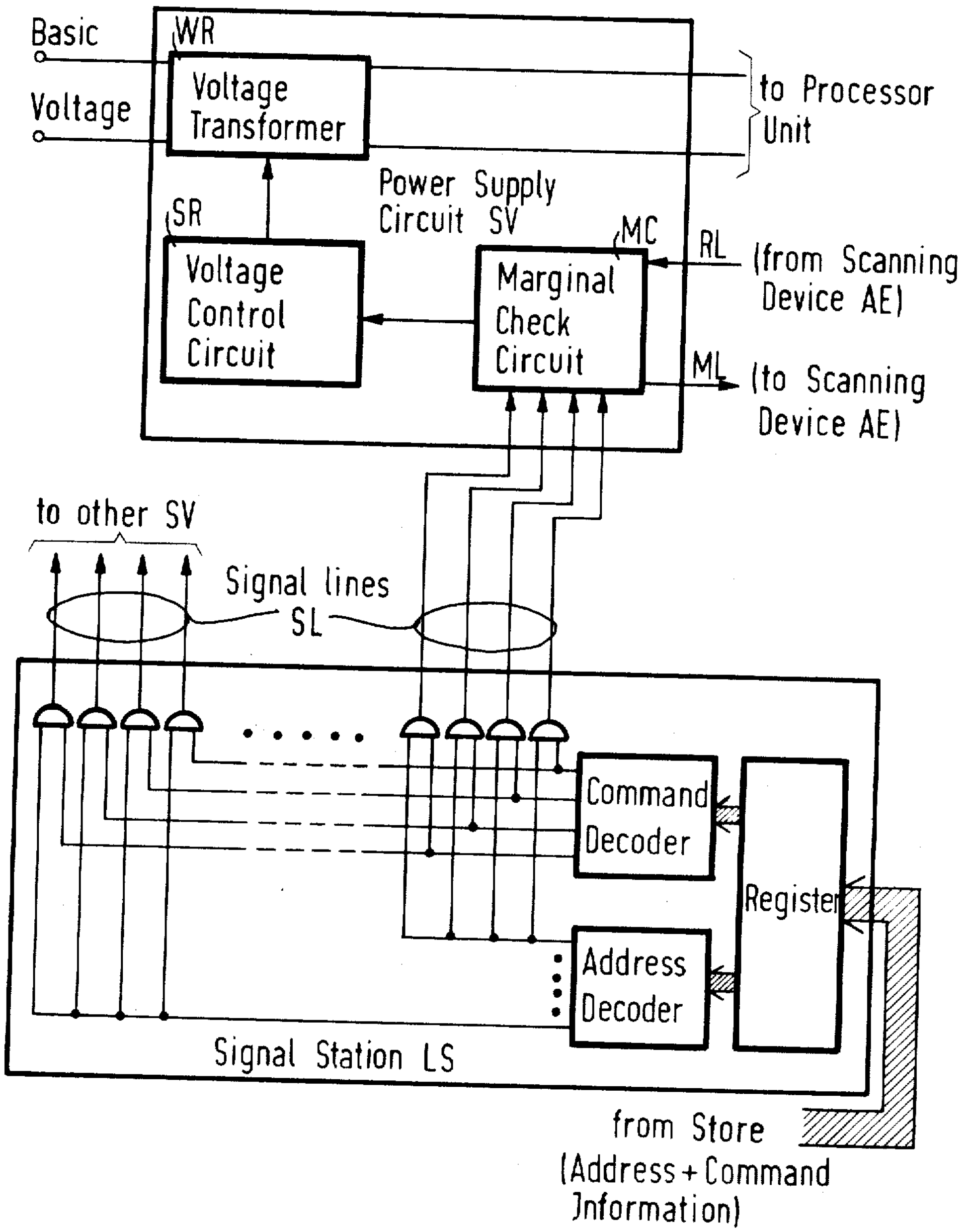

In conjunction with FIG. 3 the current supply circuit SV and the signal station LS are described in greater detail. Further, an operational description of the execution of a voltage change is given.

The signal station LS is connected with the central processor, hence, with the central store, over the lines of the standard interface SN, just as is every other unit. It contains in essence a register, a decoder for the commands and one for the address as well as a selection gating arrangement. By evaluating the coincidence between the address and the command, the four signal wires, which lead to the addressed current supplier SV, are excited according to the command. This connection arrangement is described hereinabove.

The power supply circuit contains a voltage control circuit SR and a voltage transformer WR. The latter component WR, to which a basic voltage is applied at its input (60V for example), actually contains a vibrator, a transformer, as well as filter and limiter elements at the input and output ends. Thyristors are present in WR as control switching means, for generating a specific output voltage, or one which suits the system. The igniting moments of the thyristor can be controlled over the circuit component SR. Thus, if a command to change the voltage is sent to circuit component MC over the signal wires SL, a specific signal arises at its output. This signal is evaluated in the circuit component SR in a manner such that the ignition of the thyristors in the circuit component WR is altered. The further structural details of the power supply circuit are known in the art and are not described further herein. Thus, the circuit component MC can contain relays over whose contacts different taps of a voltage divider are connected with the output. The circuit component SR can contain a difference amplifier, for example.

The marginal check circuit MC within every power supply SV transmits a notification datum over the line ML with each executed evaluation of the command arriving over the signal wires AL. In the figures of this application, this line is shown as a single collective line, just as is the resetting line. However, one is dealing here with a bundle of lines, which connect a power supply with the scanning device AE. Scanning device AE, for example, operates according to the search principle. The device is attached to the system unit, over which the store can be provided with information from outside, for example over punch-tape input apparatuses. Through the connection of the notification line to this device, a specific address is defined in the store, in which then the notification datum is entered as acknowledgment for the executed voltage change.

The solution according to the invention, of executing voltage changes under program control offers the great advantage that during operation of a data processing system, data concerning the correct manner of operation of the individual electronic components in the system units can be entered in the store, and an easier surveillance of the total system is possible. This is possible because these stored data are available to a routine test program. However, the latter is not the subject of the present invention.

The descriptions given hereinabove are intended only to be exemplary of the principles of the invention. It is anticipated that modifications or changes to the described embodiments may be made within the scope of the invention.

We claim:

1. A method for testing system units in a data processing system by adjusting the power supply circuits connected to said system units for changing the supply voltage applied to the system units being tested said method comprising the steps of:

requesting, through a program control unit, and receiving a storage cycle from a central memory, from which memory a command signal is received, forming from said command signal an information signal to which at least one of said power supply circuits is responsive, changing, responsive to said information signal, the voltage applied to at least one system unit connected to one of said power supply circuits being adjusted, said power supply circuit being adjusted to produce supply voltage for said system unit substantially at the limit of the supply voltage range prescribed for said system unit and determining said system unit's operability from its response to the changed voltage.

2. The method defined in claim 1 wherein said changing step further comprises changing the voltage in the region of said limit in a stepwise manner and in predetermined increments.

3. The method defined in claim 1 wherein said forming step occurs within a central portion of said data processing system.

4. The method defined in claim 1 wherein said forming step occurs in a means peripheral to said data processing system.

5. The method defined in claim 1 comprising the further step of:

transmitting a resetting signal to said power supply circuit to cause said power supply circuit to revert to the supply voltage at which the connected system unit normally operates.

* * * * *